United States Patent
Marocco et al.

[11] Patent Number: 5,941,221
[45] Date of Patent: Aug. 24, 1999

[54] RECIPROCATING ENGINE COMBUSTION CHAMBER

[76] Inventors: Gregory M. Marocco, 49 Stoney Brook Rd, Montville, N.J. 07045; Gregory J. Colletti, 1572 Rahway Ave., Westfield, N.J. 07090

[21] Appl. No.: 09/135,806

[22] Filed: Aug. 18, 1998

[51] Int. Cl.[6] .................................................. F02B 23/08
[52] U.S. Cl. ...................... 123/657; 123/667; 123/193.5
[58] Field of Search ................................ 123/193.5, 657, 123/661, 665, 666, 667

[56] References Cited

U.S. PATENT DOCUMENTS

| | | |
|---|---|---|
| 2,347,097 | 4/1944 | Ginn et al. . |
| 2,878,800 | 3/1959 | Burrell . |
| 2,954,023 | 9/1960 | Lampredi . |
| 2,991,780 | 7/1961 | Brien . |
| 3,496,923 | 2/1970 | Bashista ................................... 123/191 |
| 4,254,621 | 3/1981 | Nagumo ..................................... 60/282 |
| 5,257,612 | 11/1993 | Smith, Jr. et al. . |

FOREIGN PATENT DOCUMENTS

| | | |
|---|---|---|
| 52-54820 | 5/1977 | Japan . |
| 52-64511 | 5/1977 | Japan . |
| 722149 | 1/1955 | United Kingdom . |

*Primary Examiner*—Noah P. Kamen
*Assistant Examiner*—Brian Hairston
*Attorney, Agent, or Firm*—Richard C. Litman

[57] ABSTRACT

A combustion chamber for reciprocating internal combustion engines greatly reduces large quench areas in the combustion chamber, and substantially matches the combustion chamber periphery with the upper edge circumference of the mating cylinder wall, to reduce greatly or substantially eliminate narrow quench areas of relatively high surface area to volume ratios. This increases the average combustion temperature due to the reduction of surface area relative to the volume of the combustion chamber, thereby producing more efficient combustion resulting in a reduction in unburned hydrocarbons during the combustion portion of the cycle. The removal of material to eliminate such large quench areas also slightly enlarges the combustion chamber to reduce the compression ratio, thus reducing the production of oxides of nitrogen during combustion. The combustion chamber is also radiused and smoothed internally, to eliminate rough and sharp edges which may lead to preignition and detonation. While the present disclosure is directed to the incorporation of the present combustion chamber with a General Motors small block V-8 engine, it will be seen that the present chamber is also adaptable to other single and multiple cylinder engines as well. The combustion chamber configuration is especially suited to Otto cycle engines, i. e., four stroke spark ignition engines, having at least one intake and one exhaust valve in the cylinder head. However, the present combustion chamber may also be adapted to other types of normally aspirated or super-charged reciprocating engines (two stroke, Diesel, etc.) as well.

20 Claims, 4 Drawing Sheets

RECIPROCATING ENGINE COMBUSTION CHAMBER

BACKGROUND OF THE INVENTION

1. Field of the Invention

The present invention relates generally to reciprocating internal combustion engines, and more specifically to a novel combustion chamber configuration for such engines which results in unexpected and substantial improvements in power, economy, and exhaust emissions. The combustion chamber configuration is particularly adaptable to four stroke, spark ignition or Otto cycle automobile engines having multiple cylinders, but may be adapted to other single and multiple cylinder reciprocating engines as well, such as Diesel engines, etc.

2. Description of the Related Art

Since the initial development of the reciprocating internal combustion engine in the latter part of the nineteenth century, numerous variations and improvements have been developed. Over the years, the four stroke, spark ignition (or "Otto cycle") engine with overhead intake and exhaust valves has been nearly universally accepted for use in most motor vehicles, including automobiles, boats, and aircraft. Other reciprocating engine types (two stroke cycle, two and four stroke compression ignition or Diesel cycle, etc.) have also been developed for such use, but are in the minority.

It is generally accepted that the well proven Otto cycle engine enjoys various advantages over other engine types, such as relatively low weight for the power output, relatively good fuel economy, general availability of fuel, economy of construction, and low maintenance. However, most reciprocating internal combustion engines have been burdened with an additional requirement in the latter part of the twentieth century: The requirement to produce relatively low exhaust emissions from their power output.

Experiments have been performed with all of the various types of engines mentioned above, and others, in attempting to reduce exhaust emissions to minimal levels while still maintaining the "drivability" of the engine (i. e., ease of starting when warm or cold, throttle response, power, fuel economy, etc.). Generally, it has been found that the easiest way of "cleaning up" the exhaust of most engines is to install one or more catalytic converters in the exhaust system, to complete the oxidation process of any unburned hydrocarbons which may exit the combustion chamber(s) of the engine. Other than this, various means have been used to reduce oxides of nitrogen emissions, which generally occur in relatively high temperature combustion due to high compression ratios. Accordingly, compression ratios have been reduced in the past in an attempt to reduce oxides of nitrogen emissions, but this has generally been at the expense of unburned hydrocarbons, which are then handled by catalytic converters in the exhaust system. Otherwise, there have been few, if any, modifications to the classic combustion chamber configuration of the Otto cycle engine.

Accordingly, a need will be seen for an internal engine modification which reduces various types of exhaust emissions, such as unburned hydrocarbons and oxides of nitrogen, while reducing dependence upon exhaust system modifications or additions, such as catalytic converter systems. The modification comprises a new combustion chamber configuration which is particularly adapted to Otto cycle internal combustion engines, but which may be adapted to two stroke cycle engines, compression ignition or Diesel engines of two and four stroke cycles, and other reciprocating engine configurations as well. The combustion chamber modification must also produce reasonable power and fuel economy, or at least not reduce those qualities, while at the same time reducing exhaust emissions.

While the present combustion chamber configuration does not completely eliminate undesirable exhaust emissions, it does, in combination with catalytic converter exhaust systems, reduce such emissions to well below the maximum allowable levels of emissions for current new vehicles, thus allowing the catalytic converter exhaust systems used with such engines to be reduced in size, weight, and expense for greater efficiency, or for the engine to meet exhaust standards anticipated for ultra low emissions vehicles while using a conventional catalytic converter exhaust system. A discussion of the related art known to the inventors, and the differences and distinctions between those devices of the related art and the present invention, is provided immediately below.

U.S. Pat. No. 2,347,097 issued on Apr. 18, 1944 to Earl Ginn et al. describes a Cylinder Head And Combustion Chamber Construction incorporating various features, among them a combustion chamber having an elongate or ovoid volumetric pocket for the two intake and exhaust valves and the spark plug. The concept is to provide sufficient room for the actuation of the conventional poppet valves downwardly into the combustion chamber, while removing the proximity of those valves from the sides of the combustion chamber and upper cylinder walls. While Ginn et al. note that the resulting chamber shape is "somewhat spherical in contour" (column 2, line 37), this is not precisely correct, as the shape is actually somewhat ovoid, as may be seen in the cross sections of FIGS. 3, 4, and 5 of the Ginn et al. patent. This results in a relatively flattened ledge to each side of the ovoid combustion chamber which overlies a part of the underlying cylinder, as shown in FIG. 5 of the Ginn et al. patent. Such ledges within the combustion chamber are now known to be disadvantageous, as they (1) increase the "quench" area of the combustion chamber by increasing the surface area of the chamber relative to the volume of the chamber, and (2) provide additional relatively abrupt and sharp edges in the chamber, which lead to localized hot spots and potential preignition and detonation, and which also disrupt smooth gas flow in the combustion chamber. The present combustion chamber configuration eliminates the flattened ledge of earlier combustion chambers, and smoothes the internal surfaces of the chamber to smooth gas flow and eliminate sharp edges.

U.S. Pat. No. 2,878,800 issued on Mar. 24, 1959 to Gilbert Burrell describes a Frusto Conical Combustion Chamber And Method Of Making Same. The object of the Burrell disclosure is to reduce substantially the excess volume of the combustion chamber, which extends beyond the upper edges of the cylinder. This provides a relatively sharp edge along the upper edge of the cylinder which leads to preignition and detonation, as noted above in the discussion of the Ginn et al. disclosure. Burrell recognizes this problem, as evidenced in column 1, lines 39–40 of his patent. However, the Burrell combustion chamber does not completely eliminate this overhanging "pocket" of the combustion chamber extending beyond the periphery of the cylinder, as shown clearly in FIG. 2 of the Burrell patent. Moreover, the Burrell combustion chamber is a wedge shaped chamber, which while being reasonably efficient, also produces a relatively large quench area opposite the spark plug, with its resulting reduction in combustion temperature due to the relatively large amount of surface area per volume and the resulting increases in unburned hydrocarbons. The present combustion chamber essentially eliminates such quench areas, while also smoothing any edges and the like within the chamber and chamber/ cylinder interface, to eliminate or at least greatly reduce the potential preignition, detonation, and unburned hydrocarbon emissions problems which can be caused by such configurations.

U.S. Pat. No. 2,954,023 issued on Sep. 27, 1960 to Aurelio Lampredi describes a Combustion Chamber For Internal Combustion Engines, comprising a shape formed of a plurality of non-concentric hemispherical sections. The result is not a true hemispherical chamber, and is far removed from the present chamber, with its combination of hemispherical and wedge shapes and substantial reduction of quench areas and preignition producing sharp edges.

U.S. Pat. No. 2,991,780 issued on Jul. 11, 1961 to Wayne V. Brien describes Combustion Chambers For Internal Combustion Engines formed of a plurality of intersecting geometric shapes for ease of manufacture. Brien states that quench areas are important to cool the last of the burning mixture to avoid detonation, but the last portion of the combustion does not occur until the piston is moving away from the cylinder head and combustion chamber, thereby eliminating any close spacing or quench area between piston and cylinder head. The primary purpose for such close spacing at top dead center of the piston, is to provide the desired high compression ratio for high efficiency of the engine. In any event, the present combustion chamber teaches away from the relatively sharp edges produced by the multiple geometric shapes defining the Brien combustion chamber, by providing a smoothly contoured combustion chamber having a relatively high compression ratio due to the semi-wedge configuration, but also greatly reducing or eliminating substantial quench areas and edges which might lead to preignition and detonation.

U.S. Pat. No. 5,257,612 issued on Nov. 2, 1993 to Richard W. Smith, Jr. et al. describes an In-Line Cylinder Head For An Internal Combustion Engine. The combustion chamber described is basically that of a General Motors small block V-8 from 302 to 350 cubic inches. The intake passages of the head are modified, but the combustion chamber configuration appears to be no more than slightly modified from the stock configuration of the GM small block V-8. While the present disclosure is also based upon the GM small block V-8 head, the combustion chamber shape is modified substantially from that of the stock configuration, and from the configuration shown in Smith, Jr. et al. Smith, Jr. et al. provide a ridge extending between intake and exhaust valves, which ridge is smoothed and reduced substantially in the present combustion chamber. Smith, Jr. et al. state that the ridge assists in reducing crossover from intake flow to the exhaust port when valve overlap occurs at the top of the exhaust stroke, but such crossover is minimal on most engines due to both intake and exhaust valves being nearly closed when the piston is at top dead center of its travel in order to preclude interference between the piston crown and the valves. Smith Jr. et al. also do nothing to eliminate the large flat surface of the combustion chamber opposite the spark plug, which produces a large quench area at top dead center of the piston stroke. The present chamber opens this area up considerably to reduce combustion heat loss from the otherwise relatively large surface area per volume ratio, thus increasing thermal efficiency and reducing unburned hydrocarbons due to incomplete combustion.

British Patent Publication No. 722,149 published on Jan. 19, 1955 to Ronald F. Golding et al. describes Improvements In Or Relating To Combustion Chambers Of Internal Combustion Engines. Golding et al. provide a "lozenge shape" (page 1, line 62) or oval combustion chamber, having extensive quench areas to opposite sides of the intake and exhaust valves. The undesirability of such quench areas has been noted further above. Golding et al. further provide a ledge or discontinuity in the side of the combustion chamber, to deflect the incoming intake charge from the exhaust valve in order to reduce the possibility of preignition of the charge due to contact with the hot exhaust valve. This teaches away from one of the points of the Smith, Jr. et al. patent discussed immediately above, in that Smith, Jr. et al. provided for circulation of the incoming fuel and air charge over the exhaust valve for cooling of the valve. Thus, two different theories of operation are disclosed in these two patent documents, neither of which describe or suggest the specific improvements provided by the present combustion chamber configuration for reducing emissions and increasing efficiency.

Japanese Patent Publication No. 52-54820 published on May 4, 1977 illustrates a combustion chamber configuration having a predetermined hemispherical radius centered on the spark plug electrode. Cross sections of other combustion chamber shapes are also shown, but none appear to have the characteristics or configuration of the combustion chamber of the present invention.

Finally, Japanese Patent Publication No. 52-64511 published on May 28, 1977 illustrates an internal combustion engine having a combustion chamber configuration essentially identical to that of the 54820 Japanese patent publication discussed immediately above. According to the English abstract, the 64511 patent publication also includes a three way catalytic converter, exhaust gas analyzing means, and fuel control means in combination with the specific combustion chamber configurations. In any event, as the combustion chamber configurations appear to be essentially identical with those of the 54820 patent publication, no similarity is seen to the present combustion chamber configuration.

None of the above inventions and patents, either singly or in combination, is seen to describe the instant invention as claimed.

SUMMARY OF THE INVENTION

The present invention is a combustion chamber configuration for a reciprocating internal combustion engine. The combustion chamber configuration is especially suited to Otto cycle engines, i. e., four stroke spark ignition engines, having at least one intake and one exhaust valve in the cylinder head. However, the present combustion chamber may also be adapted to other types of reciprocating engines (two stroke, Diesel, etc.) as well. While the present disclosure is directed to the incorporation of the present combustion chamber with a General Motors small block V-8 engine, it will be seen that the present chamber is also adaptable to other single and multiple cylinder engines as well.

The invention basically comprises the substantial elimination of large quench areas in the combustion chamber, and the substantial matching of the combustion chamber periphery with the circumference of the upper edge of the mating cylinder wall, to reduce greatly or substantially eliminate narrow quench areas having relatively high surface area to volume ratios. This results in an increase in the average combustion temperature due to the reduction of surface area relative to the volume of the combustion chamber, thereby producing a more efficient combustion resulting in a reduction in unburned hydrocarbons during the combustion portion of the cycle. The removal of material to eliminate such large quench areas also slightly enlarges the combustion chamber and reduces the compression ratio, thus reducing the production of oxides of nitrogen during combustion. The combustion chamber is also radiused and smoothed internally, to eliminate rough and sharp edges which may lead to preignition and detonation.

Accordingly, it is a principal object of the invention to provide an improved combustion chamber configuration adapted for incorporation with Otto cycle reciprocating internal combustion engines having in head intake and exhaust valves, but which may be adapted to other types of reciprocating internal combustion engines as well.

It is another object of the invention to provide an improved combustion chamber configuration which largely eliminates substantial quench areas within the combustion chamber, thereby reducing the combustion chamber surface area to volume ratio.

It is a further object of the invention to provide an improved combustion chamber configuration which eliminates rough surfaces and sharp edges within the combustion chamber, thereby substantially eliminating hot spots which may lead to preignition and detonation within the combustion chamber.

An additional object of the invention is to provide an improved combustion chamber configuration which is further adapted for use in normally aspirated single or multiple cylinder engines, and which is particularly suited for use in supercharged engines due to the slight reduction in compression ratio provided by the removal of quench area and edges within the combustion chamber.

Still another object of the invention is to provide an improved combustion chamber configuration which may be incorporated with an engine using additional exhaust emission control means for further improvements in exhaust emissions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a novel combustion chamber configuration for a reciprocating internal combustion engine, particularly an engine using the four stroke, spark ignition Otto cycle principle, although the present combustion chamber configuration may be adapted to reciprocating engines using other principles of operation as well. The present combustion chamber configuration is particularly well suited as a modification to existing overhead valve engines, particularly "small block" V-8 engines of 302 to 350 cubic inch displacement manufactured by General Motors Corporation.

Figure 1:
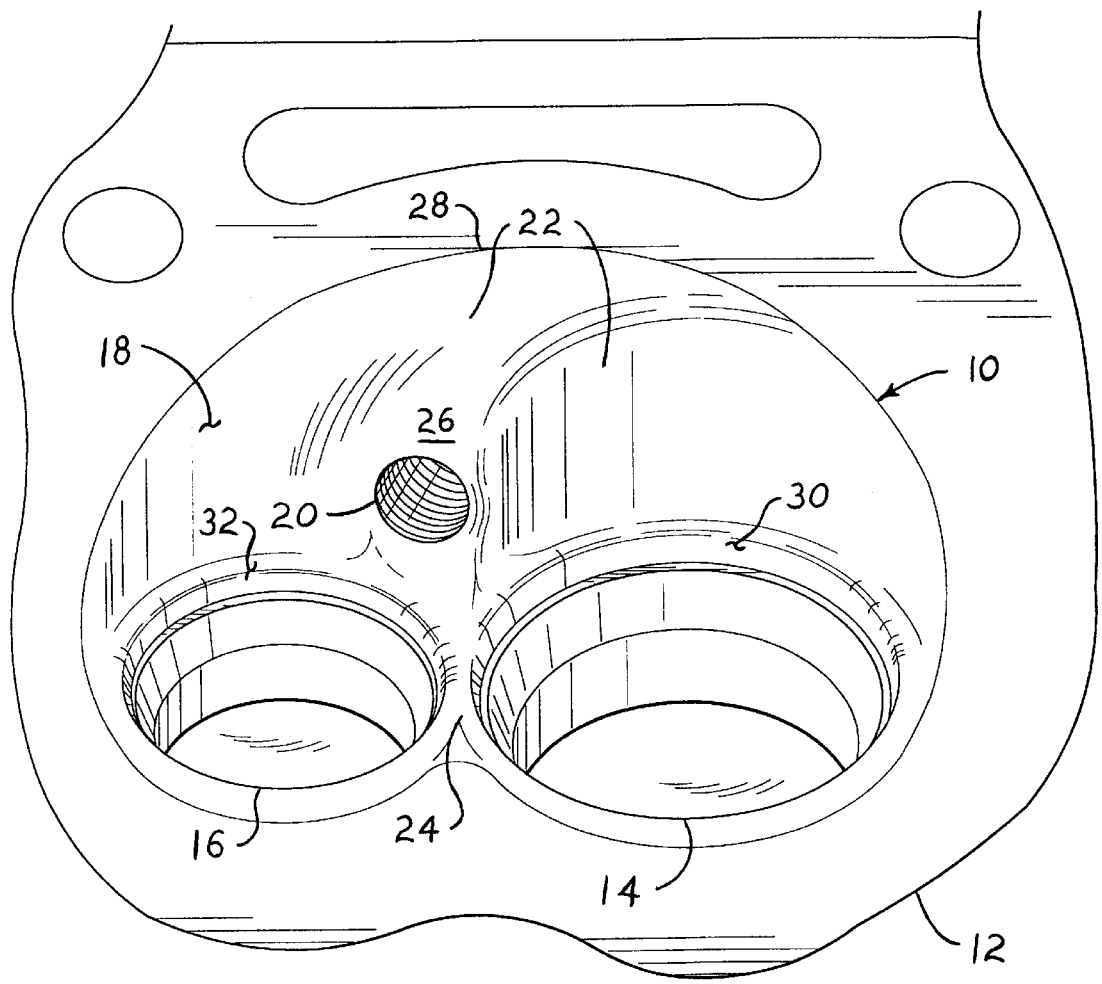
FIG. 1 is a perspective view of a combustion chamber of the present invention, showing its various features.

FIG. 1 provides a perspective view of a combustion chamber 10 of the present invention, with a portion of the surrounding cylinder head 12 being shown. The cylinder head 12 portion shown in FIG. 1 represents a portion of the head for installation with a multiple cylinder engine, e. g., a General Motors small block V-8. Such cylinder heads 12 have adjoining combustion chambers in a single bank formed as "mirror images" of one another, in order to place intake and exhaust valves closer to one another in adjacent cylinders for more efficient manufacture of the intake and exhaust manifolds. Accordingly, it will be seen that while the intake port 14 is located to the right of the exhaust port 16 in the combustion chamber 10 of FIG. 1, and in the combustion chamber C of FIG. 4, that adjacent combustion chambers would have the relative positions of their ports reversed, with the intake port to the left and exhaust port to the right. However, the principles involved in the present combustion chamber remain the same, regardless of the orientation of the ports within the combustion chamber and head.

Figure 4:
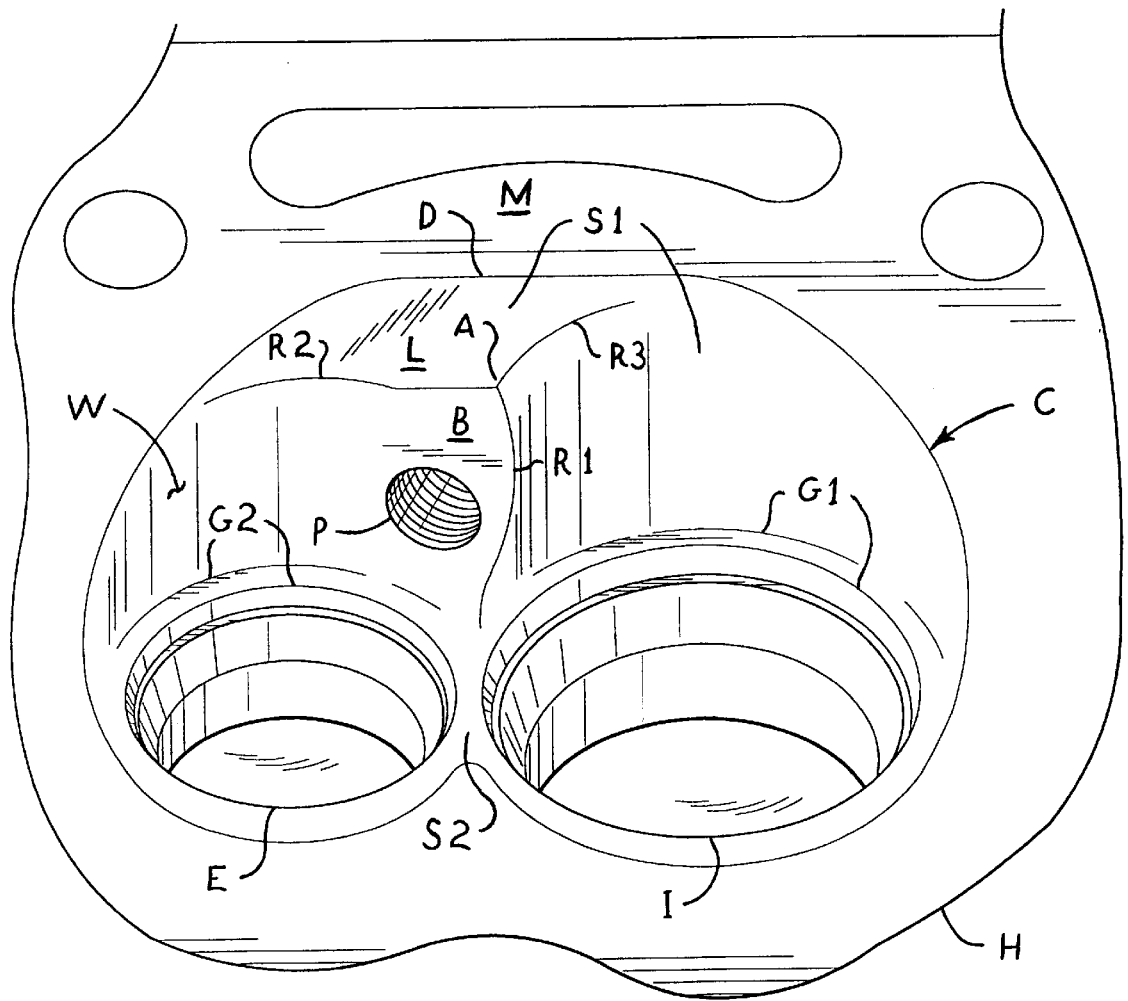
FIG. 4 is a perspective view of a prior art combustion chamber of a General Motors small block engine, illustrating the differences between such a prior art combustion chamber and the present combustion chamber.

While the cylinder head 12 of FIG. 1 represents a portion of a conventional small block General Motors V-8 head, the combustion chamber 10 of the present invention is considerably different from the combustion chamber C of the prior art shown in FIG. 4. A comparison of the combustion chamber 10 of FIG. 1 with the prior art General Motors small block combustion chamber C shown in FIG. 4, will clearly show the differences and distinctions between the present combustion chamber and the prior art.

The combustion chamber 10 of FIG. 1 is defined by a generally concave chamber surface or wall 18 formed within the cylinder head 12, with the intake valve port 14 and exhaust valve port 16 located adjacent one another. An ignition plug passage 20, e. g., for a spark plug for an ignition type engine, is positioned generally on a line between the two valve ports 14 and 16, and laterally offset from the ports 14 and 16. It will be seen that the first side 22 of the chamber wall 18, adjacent the spark plug passage 20, is of a generally spherical section, i. e., defining a shape somewhat like a portion of a sphere. The opposite second side 24, toward the opposite side of the valve ports 14 and 16 from the ignition plug passage 20, has a sloped, generally wedge shaped configuration. This is shown more clearly in FIG. 2.

To this point, the above described features of the combustion chamber 10 of FIG. 1 correspond closely with equivalent features of the prior art combustion chamber C of FIG. 4, with the chamber C within the cylinder head H of FIG. 4 being defined by a combustion chamber wall W. The combustion chamber C of FIG. 4 also has an intake port I, an adjacent exhaust port E, and an ignition plug passage P which is positioned generally on a line between the two ports I and E and offset laterally from the two ports I and E. A relatively heavy portion of the cylinder head casting forms a boss B generally surrounding the spark plug passage P. The equivalent boss structure (highly modified) is designated by the reference numeral 26 in the present combustion chamber invention shown in FIGS. 1 and 2.

Figure 2:
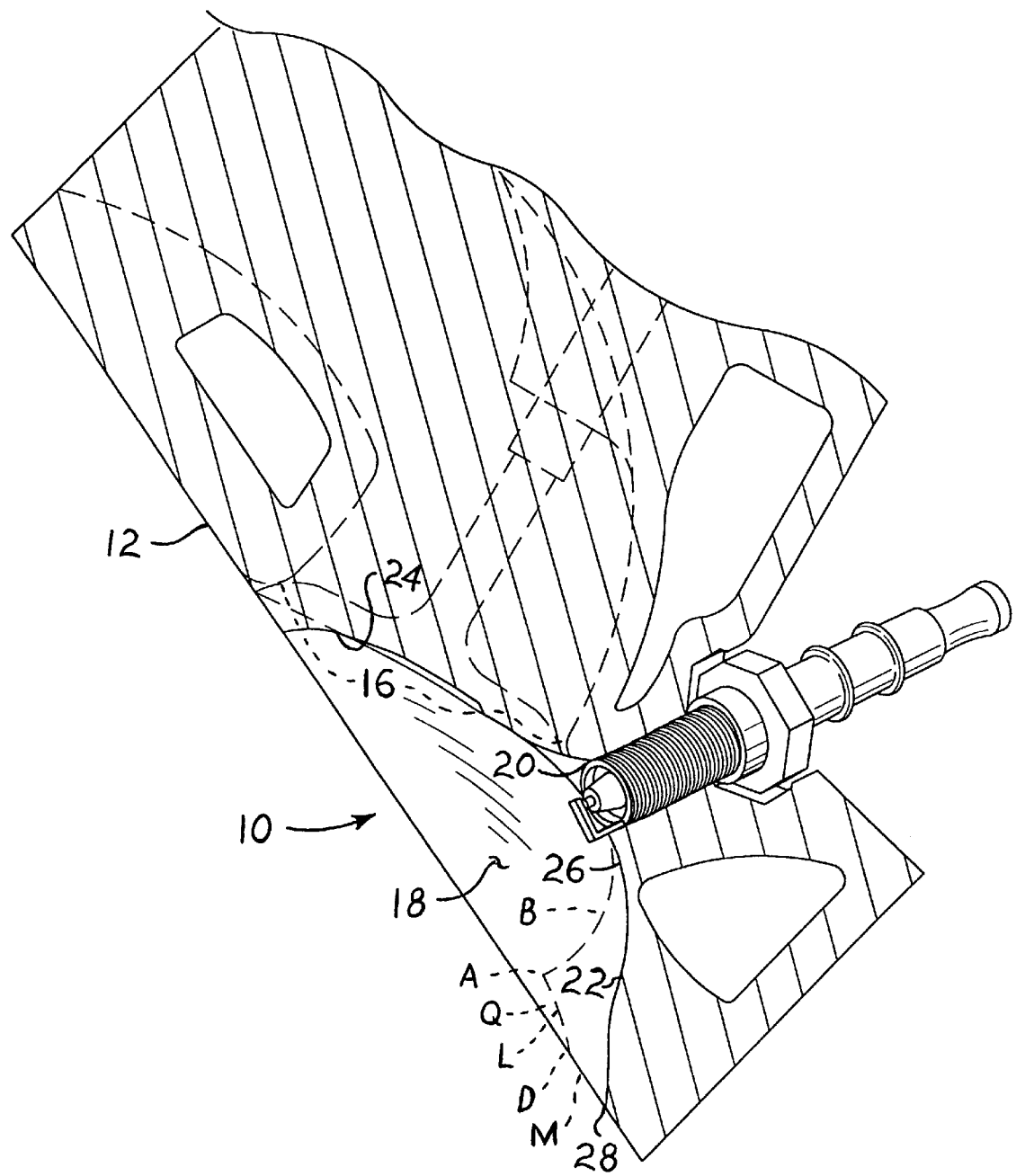
FIG. 2 is an elevation view in section of the combustion chamber of FIG. 1, showing the cross section of a prior art General Motors small block combustion chamber in broken lines.

However, it will be seen that the first side S1 of the combustion chamber C of FIG. 4 is formed considerably differently than the first side 22 of the combustion chamber 10 of the present invention shown in FIGS. 1 and 2. The cylinder head casting forming the combustion chamber C of FIG. 4, is generally relatively rough and unfinished, and includes numerous ridges, ledges, and protrusions which interrupt gas flow through the chamber C and produce localized hot spots which can lead to preignition and detonation of the fuel and air mixture during the compression and power strokes of engine operation.

While one of the factors involved in determining a minimum fuel octane number for satisfactory engine operation is the compression ratio of the cylinder, other factors enter into the selection of octane rating as well, such as the relatively sharp ridges and protrusions noted above, as well as "quench areas" where little space remains between the piston and the combustion chamber wall when the piston is at top dead center of its travel. The present combustion chamber configuration 10 alleviates many of these problems, enabling the engine to be operated on a lower octane fuel with fewer additives, thereby reducing exhaust emissions. Alternatively, greater power may be obtained from the present combustion chamber configuration, through timing adjustments and other modifications known in the art.

The spark plug boss area B of the prior art combustion chamber C of FIG. 4, will be seen to include a relatively sharp ridge R1, which extends generally from a point between the two valve ports E and I, alongside the spark plug passage P, to an apex A which is quite close to the surface of the cylinder head H where it mates with the underlying cylinder block (not shown). This prior art configuration is shown in broken lines in the cross sectional view of the present combustion chamber configuration 10 of FIG. 2. The primary purpose of this ridge R1 is as a matter of convenience in the casting of the cylinder head H, as it is somewhat more difficult to remove all of the protrusions, ledges, and sharp edges of a casting mold. This particular combustion chamber design is also relatively old, and was initially developed when emissions were not so much of a concern as today, and when very high octane fuels containing tetraethyl lead additives were readily available. In the present environment, such protrusions and edges are detrimental to optimum operation of the engine, as they restrict complete burning of the fuel and air mixture due to their protrusion into the combustion chamber, and require at least a somewhat higher fuel octane in order to avoid preignition and/or detonation problems caused by such sharp edges and protrusions.

It will also be noted that the prior art combustion chamber C of FIG. 4 includes a relatively flat ledge L, which extends from the lower or peripheral edge D of the combustion chamber C at the first surface S1 of the chamber C. Such flat areas and ledges were considered beneficial to fuel and air combustion in the past, as they provided a very narrow "quench" area between the cylinder head H and the top of the piston at top dead center, which normally rises to about the bottom surface of the cylinder head. The extremely narrow quench area Q between the ledge L and mating surface M of the cylinder head H, is shown clearly in the prior art combustion chamber of FIG. 4. Such quench areas served to raise the compression ratio of the engine, and also created a relatively high surface area to volume ratio, which resulted in a relatively large amount of heat dissipation from the burning fuel and air mixture in the quench area. This was important at the time, as the heat dissipation tended to reduce the tendency for the fuel and air mixture to detonate due to the relatively high compression ratio. However, such quench areas also resulted in sufficient cooling of the fuel and air mixture, that a fair amount of unburned fuel in the quench area resulted. This is of course unacceptable in the present environment, due to emissions standards and the need for ever greater engine operating efficiency.

Accordingly, the present combustion chamber 10 substantially eliminates such quench areas, by removing much of the material comprising the spark plug boss B of the prior art combustion chamber C. The remaining spark plug boss 26 bears practically no resemblance to the boss B of the prior art chamber, with the boss 26 being smoothly rounded and blending smoothly with the generally spherical shape of the first side 22 of the combustion chamber 10, adjacent the ignition plug passage 20. This eliminates the ledge L and quench area Q of the prior art combustion chamber C.

In addition to the above described distinctions between the prior art combustion chamber C and the present chamber 10, it will be noted that the periphery 28 of the present combustion chamber 10 at the edge of the first side 22, extends completely outwardly to form a circular combustion chamber periphery defined by the circumference of the mating cylinder (not shown) of the engine. This serves to reduce further any quench areas within the combustion chamber 10. The prior art combustion chamber C includes a machined mating surface M which extends over the underlying cylinder, and results in a non-circular periphery D at the first side S1 of the combustion chamber C. This mating surface M results in an even greater quench area for the prior art combustion chamber C, as may be seen in FIG. 4.

The combustion chamber 10 of FIGS. 1 and 2 includes further refinements to improve gas flow through the chamber 10, by smoothly radiusing both the intake and exhaust ports 14 and 16. Typically, the peripheries of these ports are relatively rough and include one or more circumferential ridges or lips, exemplified by the ridges G1 and G2, respectively surrounding the intake and exhaust ports I and E of the prior art combustion chamber C of FIG. 4. In contrast, the peripheries 30 and 32 of the respective intake and exhaust ports 14 and 16 of the present combustion chamber 10 have been smoothly rounded and radiused in order to smooth the gas flow into the combustion chamber 10 through the intake port 14, and outwardly from the combustion chamber 10 through the exhaust port 16, as much as possible.

In the past, it was desirable to create relatively sharp edges in combustion chambers, such as the intake port ridges G1, ridges R1 beside the spark plug passage P, and further ridges R2 and R3 along the quench area ledge L of the prior art combustion chamber C of FIG. 4. (It was also easier to form an exhaust port E periphery incorporating a series of ridges G2, than to machine the periphery smoothly to provide more efficient gas flow.) These ridges and edges created a fair amount of turbulence in the air and fuel mixture as it filled the cylinder and combustion chamber prior to ignition, and also after ignition. This turbulence assisted in mixing the fuel and air mixture completely, which was not always achieved in engines having carbureted fuel systems. Such carbureted systems generally resulted in relatively large fuel droplets being unevenly mixed with air as the air passed through the carburetor venturi(s), and the turbulence within the cylinder and combustion chamber assisted in mixing and further evaporating the fuel in the incoming air charge to the cylinder.

On the other hand, fuel injection systems have largely eliminated this problem, and result in the fuel charge being evenly distributed into the incoming air charge to the cylinder. Thus, the need for such turbulence increasing protrusions has been largely eliminated by means of fuel injection systems, and the present combustion chamber 10 is formed for maximum efficiency with such fuel injection systems to provide the smoothest possible gas flow into, through, and from the combustion chamber 10.

While the present disclosure has discussed in detail the differences between the present combustion chamber 10 configuration and a prior art combustion chamber C of the General Motors small block V-8 type, it will be seen that the present combustion chamber 10 configuration may be adapted to a multitude of otherwise conventional overhead valve single and multiple cylinder engines operating on the four stroke Otto cycle, or two or four stroke compression ignition or Diesel cycle, as desired. The substantial elimination of a massive spark or ignition plug boss, substantial elimination of quench areas, matching the combustion chamber periphery with that of the mating cylinder, and smoothly rounding the peripheries of the intake and exhaust ports, all serve to create a combustion chamber 10 which provides considerably more efficient operation in the present operating environment.

Figure 3:
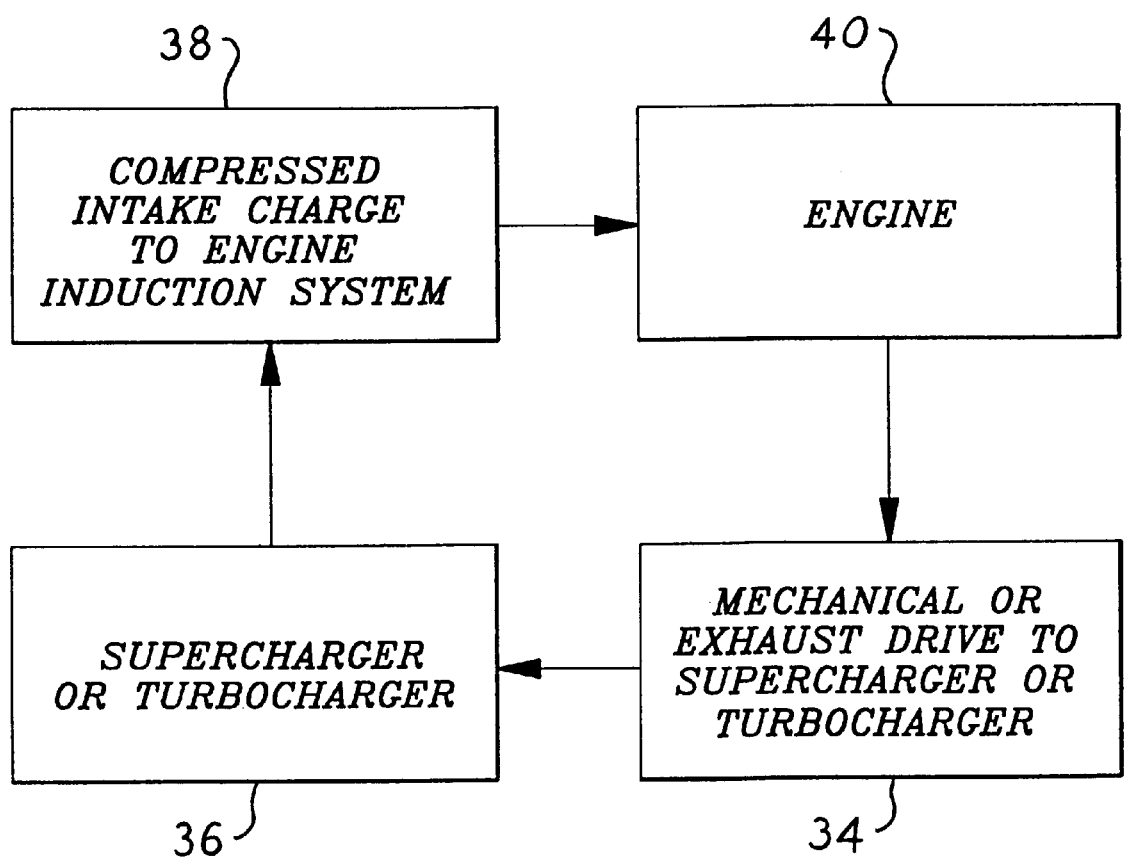
FIG. 3 is a block diagram of the basic components comprising a supercharged engine, and their relationships.

The present combustion chamber configuration, with its reduced fuel octane requirements for normally aspirated operation, also lends itself well to use with an engine using a forced induction system, as indicated in the flow chart of FIG. 3. Such forced induction systems include a mechanical (belts, gears, etc.) or exhaust drive 34, which in turn respectively drives a supercharger or turbocharger 36. The turbocharger or supercharger compresses the air entering the induction system to provide a denser intake charge 38, which is fed to the engine 40. The greater power developed produces more heat, but the present combustion chamber 10, with its increased efficiency, is capable of accepting the greater heat and power output of such a forced air induction system.

The present combustion chamber configuration 10 may be incorporated with additional engine and exhaust modifications to increase efficiency further, if desired. For example, modifications may be made to the induction system of the engine to smooth air flow into the system. Fairings and other such devices are known to improve the volume of air entering the engine by reducing turbulence at the throttle body. Also, while the present combustion chamber 10 configuration results in relatively low emissions in comparison to combustion chambers of the prior art, further improvements in emissions output may be achieved with the use of one or more catalytic converters in the exhaust system of the engine. A General Motors small block V-8 engine using the present cylinder head configuration has been tested extensively to determine power output, fuel consumption, and exhaust emissions, according to California Air Resources Board (C.A.R.B.) testing standards. The results of this testing are shown in Table I below.

TABLE I

PERFORMANCE TEST RESULTS

| | TOTAL HYDROCARBONS | CARBON MONOXIDE | OXIDES OF NITROGEN |
|---|---|---|---|
| 1992 CARB STANDARDS | .41 Grams/Mile | 3.4 Grams/Mile | 1.0 Grams/Mile |
| 1992 CORVETTE (New Catalytic Converters) | .33 Grams/Mile | 1.8 Grams/Mile | 0.63 Grams/Mile |
| 1992 | .51 | 3.3 | 0.88 |

TABLE I-continued

PERFORMANCE TEST RESULTS

| | TOTAL HYDROCARBONS | CARBON MONOXIDE | OXIDES OF NITROGEN |
|---|---|---|---|
| MAROCCO (Damaged Catalytic Converters) | Grams/Mile | Grams/Mile | Grams/Mile |

It should be noted that the results in the above table should not be taken at face value, but that the test results for the 1992 Corvette were done with an essentially new car, with all emissions equipment (including catalytic converters) in place and operating optimally. The 1992 Marocco is a custom built performance car, based upon the 1992 Corvette chassis and using the same 350 cubic inch small block General Motors V-8 engine as the 1992 Corvette. The emissions equipment of the 1992 Marocco is identical to that of the 1992 Corvette, with the exception of the catalytic converters.

The 1992 Marocco converters had been extensively damaged in previous performance testing due to an engine failure, and were contaminated with metal and coolant from the damaged engine. In order to show the efficiency of the present combustion chamber invention, these damaged catalytic converters were left on the car during further emissions testing. As can be seen from the above table, the carbon monoxide and oxides of nitrogen emissions from the Marocco engine using the combustion chamber configuration of the present invention, and without proper catalytic converters, are at least slightly lower than the standards for other automobiles and engines of that year, i. e., 1992. The total hydrocarbons from the Marocco engine (again, with the catalytic converters having been severely damaged to the point that the catalytic reactions were at most a small percentage of optimum) were only 0.10 grams per mile higher than the maximum allowable. This emissions efficiency is attributable to the combustion chamber configuration according to the present invention.

A further test was done at a New Jersey Official Emissions Inspection Center in Westfield, N.J. New Jersey emissions tests current at the time were for idle emissions only, and did not test for oxides of nitrogen. Testing of the 1992 Marocco, with the 350 V-8 engine and combustion chamber configuration of the present invention and heavily damaged catalytic converters, resulted in both carbon monoxide emissions and hydrocarbon emissions of zero.

It was suggested that further testing be accomplished at private emissions inspection centers. Such testing consistently resulted in zero carbon monoxide emissions, and hydrocarbon emissions ranging from zero to ten parts per million. Two tests using Indolene clear test fuel resulted in zero carbon monoxide emissions and hydrocarbon emissions of five parts per million and one part per million. The variation in hydrocarbon emissions is believed to result from differences in density altitude due to test station elevation and ambient pressure and temperature. The configuration of the engine and exhaust system were essentially identical to that of a 1992 Corvette, with the exception of (1) the extensively damaged catalytic converters of the test car, and (2) the combustion chamber configuration of the test car.

Again, it is felt that the sole cause of the impressively low exhaust emissions of the car using the present combustion chamber configuration, is almost entirely due to the combustion chamber, and that any other factors play no more than a very minor role in explaining the results of the above described tests.

In summary, the present cylinder head configuration will be seen to provide a significant advance in internal combustion efficiency, providing additional power, fuel economy, and reductions in exhaust emissions. The present combustion chamber configuration may be formed by modifying an existing cylinder head combustion chamber, by shaping the first side of the chamber to have a generally spherical shape and substantially eliminating any protrusions, ledges, ridges, etc. extending from any bosses or the like extending into the combustion chamber from a spark plug passage, etc. The remaining structure may be smoothly rounded and blended with the generally spherical shape of the first side of the chamber, with the remaining portion of the chamber being formed to have a generally wedge shaped configuration due to the valve angle geometry normally incorporated with such cylinder heads.

The removal of cylinder head material to extend the periphery of the combustion chamber outwardly to match substantially the periphery of the underlying cylinder, also serves to remove quench area and increase efficiency. Finally, rounding and radiusing the intake and exhaust port peripheries to provide a smooth gas flow, further increases the efficiency of the present combustion chamber configuration. Again, while the above described improvements are particularly adapted for use with a General Motors small block V-8, it will be seen that they may also be adapted for use with other types of single and multiple cylinder engines having overhead valves, be they four stroke spark ignition (Otto cycle) or two or four stroke compression ignition (Diesel cycle) engines.

The present combustion chamber configuration is also easily incorporated with engines having forced air (turbocharged or supercharged) induction systems, and in fact provides significant advances in efficiency for such engines, due to the relatively larger combustion chamber volume provided and the removal of sharp edges and ridges and other obstructions which would otherwise inhibit the flow of gases within the chamber. The increases in efficiency provided by the present combustion chamber configuration will be seen to produce much desired improvements in otherwise conventional internal combustion engines, allowing those engines to meet fuel economy and emissions standards which were heretofore unattainable with such engines.

It is to be understood that the present invention is not limited to the sole embodiment described above, but encompasses any and all embodiments within the scope of the following claims.

We claim:

1. A combustion chamber configuration for a reciprocating internal combustion engine having at least one cylinder head and at least one corresponding cylinder, comprising:

a chamber wall defining a generally concave chamber formed within the at least one cylinder head, for installation over the at least one corresponding cylinder of the engine;

said chamber wall including at least one intake valve port, at least one exhaust valve port laterally adjacent to said at least one intake valve port, and at least one ignition plug passage disposed generally between said at least one intake valve port and said exhaust valve port, and laterally offset therefrom;

said chamber wall having a first side of generally spherical section adjacent said ignition plug passage, and a second side with a sloped, generally wedge shaped configuration forward said ignition plug passage;

said ignition plug passage further having a boss formed therearound, with said boss being smoothly rounded and blending smoothly with said generally spherical shape of said first side of said chamber wall adjacent said ignition plug passage;

said first side of said chamber wall further extending outwardly to a generally circular periphery for mating closely with the at least one corresponding cylinder and for substantially eliminating any quench area adjacent said first side of said chamber wall; and each said intake valve port and each said exhaust valve port including a smoothly rounded and radiused periphery for smoothing gas flow thereover and therearound.

2. The combustion chamber configuration according to claim 1, including a four stroke spark ignition reciprocating internal combustion engine assembled therewith.

3. The combustion chamber configuration according to claim 2, wherein said engine has a V-8 configuration.

4. The combustion chamber configuration according to claim 3, wherein said engine is an engine block having a nominal displacement of 350 cubic inches.

5. The combustion chamber configuration according to claim 1, including a compression ignition engine assembled therewith.

6. The combustion chamber configuration according to claim 1, including an engine having a forced induction system.

7. The combustion chamber configuration according to claim 6, wherein said forced induction system is selected from the group consisting of a mechanically driven supercharger and an exhaust driven turbocharger.

8. A method of forming a combustion chamber for a reciprocating internal combustion engine having at least one cylinder head and at least one corresponding cylinder, comprising the following steps:

(a) providing a chamber wall defining a generally concave chamber formed within the at least one cylinder head, for installation over the at least one corresponding cylinder of the engine;

(b) further providing at least one intake valve port, at least one exhaust valve port laterally adjacent to the at least one intake valve port, and at least one ignition plug passage disposed generally between the at least one intake valve port and the exhaust valve port, and laterally offset therefrom, through the chamber wall, with the ignition plug passage having a boss formed therearound;

(c) forming a first side of generally spherical section adjacent the ignition plug passage, and further forming a second side with a sloped, generally wedge shaped configuration forward the ignition plug passage;

(d) smoothly rounding and smoothly blending the ignition plug boss with the generally spherical shape of the first side of the chamber wall adjacent the ignition plug passage;

(e) extending the first side of the chamber wall outwardly to a generally circular periphery, and closely mating the periphery with the at least one corresponding cylinder, substantially eliminating any quench area adjacent the first side of the chamber wall; and (f) smoothly rounding and radiusing the periphery of each intake valve port and each exhaust valve port, for smoothing gas flow thereover and therearound.

9. The method of forming a combustion chamber according to claim 8, including the step of providing a four stroke spark ignition reciprocating internal combustion engine assembled therewith.

10. The method of forming a combustion chamber according to claim 9, including the step of providing an engine having a V-8 configuration assembled therewith.

11. The method of forming a combustion chamber according to claim 10, including the step of providing an engine block having a nominal displacement of 350 cubic inches.

12. The method of forming a combustion chamber according to claim 8, including the step of providing a compression ignition engine assembled therewith.

13. The method of forming a combustion chamber according to claim 8, including the step of providing a forced induction system with the internal combustion engine.

14. A reciprocating internal combustion engine having at least one cylinder head and at least one corresponding cylinder, and a combustion chamber configuration therefor, comprising in combination:

a chamber wall defining a generally concave chamber formed within said at least one cylinder head, for installation over said at least one corresponding cylinder of said engine;

said chamber wall including at least one intake valve port, at least one exhaust valve port laterally adjacent to said at least one intake valve port, and at least one ignition plug passage disposed generally between said at least one intake valve port and said exhaust valve port, and laterally offset therefrom;

said chamber wall having a first side of generally spherical section adjacent said ignition plug passage, and a second side with a sloped, generally wedge shaped configuration forward said ignition plug passage;

said ignition plug passage further having a boss formed therearound, with said boss being smoothly rounded and blending smoothly with said generally spherical shape of said first side of said chamber wall adjacent said ignition plug passage;

said first side of said chamber wall further extending outwardly to a generally circular periphery for mating closely with said at least one corresponding cylinder and for substantially eliminating any quench area adjacent said first side of said chamber wall; and each said intake valve port and each said exhaust valve port including a smoothly rounded and radiused periphery for smoothing gas flow thereover and therearound.

15. The engine and combustion chamber configuration combination according to claim 14, wherein said engine is a four stroke spark ignition reciprocating internal combustion engine.

16. The engine and combustion chamber configuration combination according to claim 15, wherein said engine has a V-8 configuration.

17. The engine and combustion chamber configuration combination according to claim 16, wherein said engine is an engine block having a nominal displacement of 350 cubic inches.

18. The engine and combustion chamber configuration combination according to claim 14, wherein said engine is a compression ignition engine.

19. The engine and combustion chamber configuration combination according to claim 14, including a forced induction system.

20. The engine and combustion chamber configuration combination according to claim 19, wherein said forced induction system is selected from the group consisting of a mechanically driven supercharger and an exhaust driven turbocharger.

* * * * *